United States Patent [19]

Nakanishi et al.

[11] 3,915,988

[45] Oct. 28, 1975

[54] BENZOPYRANOPYRAZOLECARBOXYLIC ACIDS

[75] Inventors: Michio Nakanishi, Oita; Yoichi Naka, Fukuoka; Ryosuke Kobayashi, Fukuoka; Masahiro Hosoya, Fukuoka, all of Japan

[73] Assignee: Yoshitomi Pharmaceutical Industries, Ltd., Osaka, Japan

[22] Filed: June 26, 1974

[21] Appl. No.: 483,345

[30] Foreign Application Priority Data

June 26, 1973 Japan.................. 48-72478

[52] U.S. Cl............. 260/310 R; 260/299; 260/311; 424/273
[51] Int. Cl.²............C07D 231/54; C07D 311/94; C07D 491/02
[58] Field of Search................ 260/310 R, 299, 311

[56] References Cited
OTHER PUBLICATIONS
Chemical Abstracts Vol. 74: 13058c (1971), Vol. 77: 88384b (1972), & Vol. 79: 136308v (1973).

*Primary Examiner*—Donald B. Moyer
*Attorney, Agent, or Firm*—Sughrue, Rothwell, Mion, Zinn & Macpeak

[57] ABSTRACT

Benzopyranopyrazolecarboxylic acids of the formula:

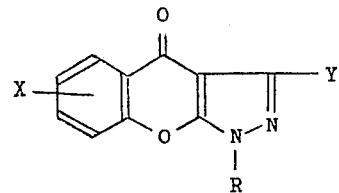

wherein X is H, lower alkyl, lower alkoxy, halogen, nitro, amino or —COOH; Y is H, lower alkyl, phenyl or —COOH; and R is H, lower alkyl or a group of the formula:

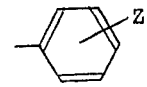

where Z is H, halogen, lower alkoxy, —SO₃H or —COOH; in which definitions at least one of X, Y and Z represents —COOH; and metal salts thereof are disclosed. They are useful as drugs for the treatment of allergic diseases.

5 Claims, No Drawings

BENZOPYRANOPYRAZOLECARBOXYLIC ACIDS

This invention relates to benzopyranopyrazolecarboxylic acids of the formula:

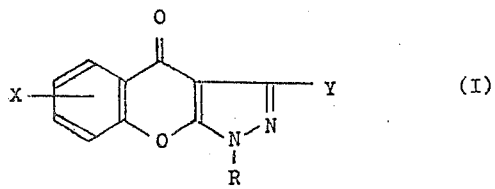

and metal salts thereof, pharmaceutical compositions containing the said compounds and the use thereof.

In the above formula, X is a hydrogen atom, a lower alkyl group, a lower alkoxy group, a halogen atom, a nitro group, an amino group or a carboxy group; Y is a hydrogen atom, a lower alkyl group, a phenyl group or a carboxy group; and R is a hydrogen atom, a lower alkyl group or a group of the formula:

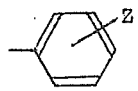

where Z is a hydrogen atom, a halogen atom, a lower alkoxy group, a sulfo group or a carboxy group; in which definitions at least one of X, Y and Z represents a carboxy group.

The lower alkyl group represented by X, Y, R and Z includes methyl, ethyl, propyl, isopropyl, butyl and isobutyl. The lower alkoxy group represented by X and Z includes methoxy, ethoxy, propoxy, isopropoxy and butoxy. The halogen atom represented by X and Z includes F, Cl and Br.

The novel compounds of formula (I) can be produced by oxidizing a compound of the formula:

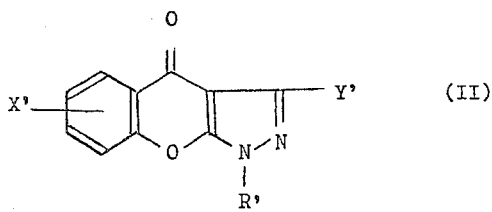

wherein X' is a hydrogen atom, a lower alkyl group, a lower alkoxy group or a halogen atom; Y' is a hydrogen atom, a lower alkyl group or a phenyl group; and R' is a hydrogen atom, a lower alkyl group or a group of the formula:

where Z' is a hydrogen atom, a halogen atom, a lower alkoxy group or lower alkyl group; in which definitions at least one of X', Y' and Z' represents a lower alkyl group.

The oxidation is advantageously carried out with potassium permanganate, in a solvent such as water, acetone, acetic acid, pyridine, benzene or a mixture thereof, if necessary in the presence of sodium hydroxide or sulfuric acid, at a temperature of from 0°C to a refluxing temperature, for about 0.5 to 50 hours. Other conventional oxidation can also be employed according to circumstances, such as oxidation with sodium dichromate, potassium dichromate, chromic acid, nitric acid or halogen.

The compounds of formula (I) wherein X is a nitro group can be produced by nitration of a compound of formula (I) wherein X is a hydrogen atom, with a mixed acid, at 0°–50°C for 0.5 to several hours. The thus produced compounds bearing a nitro group can be converted into the corresponding amino-compound, i.e. the compound of formula (I) wherein X is an amino group, by catalytic reduction over nickel, platinum or palladium, in a solvent such as ethanol, methanol, dioxane, ether, benzene or ethylene glycol monomethyl ether, with hydrogen at 50–100 atm., at 150°–200°C for 1 to several hours.

The compounds of formula (I) wherein Z is a sulfo group can be produced by sulfonation of a compound of formula (I) wherein Z is a hydrogen atom, with concentrated sulfuric acid and/or fuming sulfuric acid, at room temperature to about 100°C for 0.5 to several hours.

The compounds of formula (I) thus produced can be converted in a conventional manner into the corresponding metal salts such as Na, K, Ca, Mg and Al salts, and into the corresponding carboxylic acid derivatives such as lower alkyl ester, amide and nitrile.

The compounds of formula (I) and metal salts thereof exhibit valuable pharmacological actions such as antiallergic actions, and can be administered safely as antiallergic agents for the treatment of various kinds of allergic diseases such as asthma, urticaria, eczema, hay fever, allergic migraine and pruritus cutaneous, in the form of a pharmaceutical preparation with a suitable and conventional pharmaceutically acceptable carrier, without adversely affecting the patients.

The pharmaceutical preparations can take any conventional form such as tablets, capsules, granules, powders, injectable solutions, aerosol inhalants, creams, etc.

The daily dose of compound (I) or a metal salt thereof for human adults usually ranges from 30 to 120 mg for oral administration, in single or multiple dose, but it may vary depending upon the age, body weight, and/or severity of the conditions to be treated as well as the response to the medication.

The present invention will be better understood from the following examples, but they are not to be construed as limiting the present invention.

EXAMPLE 1

Potassium permanganate (3.7 g) is added to a solution of 5.0 g of 1,6-dimethyl-4-oxo-[1]benzopyrano[2,3-c]pyrazole in 50 ml of pyridine and 50 ml of water, and the resulting mixture is refluxed with stirring. When the purple color of the oxidation mixture disappears, 3.7 g of potassium permanganate is added. This procedure is repeated 7 times. The hot mixture is then filtered, and the manganese dioxide is washed well with hot water. The filtrate is concentrated under reduced pressure to remove the pyridine. Water is added to dissolve the remaining potassium salt of the carboxylic acid. The aqueous solution is made acidic with concentrated hydrochloric acid, and the precipitate is collected by filtration. The yield of crude 1-methyl-4-oxo-[1]benzopyrano [2,3-c]pyrazole- 6-carboxylic acid is 4.5 g (79% yield). Recrystallization from a mixture of ethanol and dimethylformamide yields 3.3 g (58% yield) of the purified product, melting over 320°C.

EXAMPLE 2

3,6-Dimethyl-4-oxo-[1]benzopyrano [2,3-c]pyrazole is treated in the presence of 10 times the molar quantity of sodium hydroxide in accordance with the procedure of Example 1 to give 4-oxo-[1]benzopyrano[2,3-c]pyrazole-3,6-dicarboxylic acid, melting over 320°C (water - ethylene glycol monomethyl ether).

EXAMPLE 3

1,6-Dimethyl-3-propyl-4-oxo-[1]benzopyrano[2,3-c]pyrazole (2 g) is treated in accordance with the procedure of Example 1. The reaction mixture after the removal of the manganese dioxide is made acidic with concentrated hydrochloric acid. The precipitated crystals are recrystallized from dioxane to give 0.4 g of 1,6-dimethyl-4-oxo-[1]benzopyrano[2,3-c]pyrazole-3-carboxylic acid melting at 261°–263°C. Concentration of the mother liquor yields 0.06 g of 1-methyl-3-propyl-4-oxo-[1]benzopyrano[2,3-c]pyrazole-6-carboxylic acid, melting at 307°–310°C.

EXAMPLE 4

1-(p-Tolyl)-4-oxo-6-methyl-[1]benzopyrano[2,3-c]pyrazole is treated in accordance with the procedure of Example 1 to give 1-(p-carboxyphenyl)-4-oxo-[1]benzopyrano[2,3-c]pyrazole-6-carboxylic acid. This product is dissolved in a 20% aqueous solution of sodium hydroxide under heating. The solution is treated with activated charcoal. The precipitated crystals are collected by filtration, and washed with acetone to give the corresponding disodium salt, melting over 350°C.

EXAMPLE 5

A mixture of 1.9 g of concentrated nitric acid and 8 ml of concentrated sulfuric acid is added dropwise to a solution of 6.9 g of 4-oxo-[1]benzopyrano-[2,3-c]pyrazole-3-carboxylic acid in 50 ml of concentrated sulfuric acid. After the addition is complete, the mixture is maintained at 40°–50°C for one hour. The reaction mixture is then cooled, and poured onto cracked ice. The precipitated crystals are collected by filtration, washed well with water, and recrystallized from ethylene glycol monomethyl ether to give 5.3 g of 6-nitro-4-oxo-[1]benzopyrano[2,3-c]pyrazole-3-carboxylic acid, melting at 288°–290°C with decomposition.

EXAMPLE 6

To a 500 ml autoclave is added 2.0 g of 6-nitro-4-oxo-[1]benzopyrano-[2,3-c]pyrazole-3-carboxylic acid, 150 ml of ethylene glycol monmethyl ether and 0.3 g of palladium carbon (5%). The autoclave is closed, pressurized with hydrogen, and kept at 180°C and 60 atm. for 2 hours. The catalyst is then filtered off, and the filtrate is concentrated. The precipitated crystals are collected by filtration, washed well with ethanol, and recrystallized from ethylene glycol monomethyl ether to give 1.2 g of 6-amino-4-oxo-[1]benzopyrano[2,3-c]pyrazole-3-carboxylic acid, melting at 282°–284°C with decomposition.

EXAMPLE 7

Fuming sulfuric acid (30%, 20 ml) is added dropwise to a solution of 5 g of 1-phenyl-4-oxo-[1]benzopyrano[2,3-c]pyrazole-6-carboxylic acid in 10 ml of concentrated sulfuric acid. After the addition is complete, the mixture is kept at 80°C with occasional stirring. The reaction mixture is then cooled, and poured onto cracked ice. The crystals formed by salting-out with sodium chloride are collected by filtration, washed with a saturated sodium chloride solution, and recrystallized from water to give 4.2 g of 1-(p-sulfophenyl)-4-oxo-[1]-benzopyrano[2,3-c]pyrazole-6-carboxylic acid, melting over 320°C.

EXAMPLE 8

A solution of 20 g of 1-phenyl-4-oxo-[1]benzopyrano[2,3-c]pyrazole-6-carboxylic acid in 700 ml of ethanol and 100 ml of dimethylformamide is saturated with hydrogen chloride, and the resulting solution is refluxed for 6 hours. The solvent is then removed under reduced pressure, and water is added to the residue. The precipitate is collected by filtration, and recrystallized from ethanol to give 20 g of ethyl 1-phenyl-4-oxo-[1]benzo-pyrano[2,3-c]pyrazole-6-carboxylate, melting at 173°–176°C.

The above ester (5 g) is suspended in 30% ethanolic ammonia (100 ml), and the suspension is heated in an autoclave at 130°–140°C for 5 hours. The reaction mixture is then cooled, and the precipitate is washed with warm dimethylformamide to give 3.8 g of 1-phenyl-4-oxo-[1]benzopyrano[2,3-c]pyrazole-6-carboxamide, melting at 305°–308°C with decomposition.

The above amide (2 g) is heated in 30 ml of hexamethylphosphorotriamide at 200°–220°C for 1.5 hours. The reaction mixture is then poured into ice water. The precipitated crystals are collected by filtration, and recrystallized from ethanol to give 1.2 g of 1-phenyl-4-oxo-[1]benzopyrano-[2,3-c]pyrazole-6-carbonitrile, melting at 233°–235°C.

Using the procedure set forth in the above examples, but substituting equivalent amount of the appropriate starting material, the following benzopyranopyrazole-carboxylic acids are also produced:

1. 1-phenyl-4-oxo-[1]benzopyrano[2,3-c]pyrazole-6-carboxylic acid, melting at 292°–294°C; its sodium salt, melting over 350°C; its magnesium salt (monohydrate), softening at 264°C and melting over 300°C; its aluminium salt [Al(acid)₂OH], melting over 300°C;

2. 1-methyl-3-phenyl-4-oxo-[1]benzopyrano[2,3-c]pyrazole-6-carboxylic acid, melting at 303°–306°C;

3. 1,3-dimethyl-4-oxo[1]benzopyrano[2,3-c]pyrazole-6-carboxylic acid, melting over 320°C;

4. 1-phenyl-3-methyl-4-oxo[1]benzopyrano[2,3-c]pyrazole-6-carboxylic acid, melting at 278°–281°C with decomposition;

5. 1-(p-methoxyphenyl)-4-oxo-[1]benzopyrano[2,3-c]pyrazole-6-carboxylic acid, melting at 282°–285°C; its sodium salt, melting over 350°C;

6. 1-phenyl-3-isobutyl-4-oxo-[1]benzopyrano[2,3-c]pyrazole-6-carboxylic acid, melting at 250°–252°C;

7. 4-oxo-[1]benzopyrano[2,3-c]pyrazole-3-carboxylic acid, melting at 258°–260°C;

8. 1-methyl-4-oxo-[1]benzopyrano[2,3-c]pyrazole-3-carboxylic acid, melting at 253°–254°C;

9. 1-phenyl-4-oxo[1]benzopyrano[2,3-c]pyrazole-3-carboxylic acid, melting at 230°–232°C;

10. 1-methyl-4-oxo-6-isopropoxy-[1]benzopyrano[2,3-c]pyrazole-3-carboxylic acid, melting at 221°–223°C;

11. p-(4-oxo-[1]benzopyrano[2,3-c]pyrazol-1-yl)benzoic acid, melting at 328°–331°C; its sodium salt, melting over 350°C;

12. 1-(m-carboxyphenyl)-4-oxo-[1]benzopyrano[2,3-c]pyrazole-6-carboxylic acid, melting at 331°–334°C; its disodium salt, melting over 350°C;

13. 1-(o-carboxyphenyl)-4-oxo-[1]benzopyrano[2,3-c]pyrazole-6-carboxylic acid, melting at 291°–294°C; its disodium salt, melting over 350°C;

14. 1-(p-carboxyphenyl)-3-methyl-4-oxo-[1]benzopyrano[2,3-c]pyrazole-6-carboxylic acid, melting over 350°C; its disodium salt, melting over 350°C.

Pharmacological Test

The compounds of the present invention exhibit antiallergic actions as shown, for example, by the following test:

Passive Cutaneous Anaphylaxis Test (PCA Test)

The experimental procedure employed was essentially identical to that described by J. Goose et al. in "Immunology", vol. 16, 749 (1969). Donryu-strain male rats each weighing 160–200 g were sensitized by the intradermal injection of 0.1 ml of rat serum containing reagin antibody (prepared by the method by Mota, Immunology, vol. 7, 681–699 (1964)) diluted ten times with isotonic sodium chloride solution, 8 rats being used for each test group. After 48 hours, the animals were challenged, that is antigen (25 mg egg albumin/kg) and Evans blue dye (12.5 mg/kg) were injected intravenously. A test solution containing a test compound was administered orally 1 hour before, or intraperitoneally 30 minutes before challenge. The animals were killed 30 minutes after challenge, the skin reflected, and the responses measured and scored 0 for diameter of wheal less than 5 mm, 1 for 5–10 mm, 2 for 10–15 mm, 3 for 15–20 mm and 4 for more than 20 mm. The percentage inhibition of PCA was calculated using the formula:

$$\text{Inhibition (\%)} = 100 - \left(\frac{\text{Mean score of treated group}}{\text{Mean score of control group}}\right) \times 100$$

The $ED_{50}$, the dose required for 50% inhibition, was calculated from the dose-response curve.

The results are summarized in the following table:

| Test Compound | $ED_{50}$ (mg/kg) i.p. | p.o. |
|---|---|---|
| A | 1–2.5 | 10 |
| B | 2 | 12 |
| C | 8.5 | 15 |

Test Compounds:

A: sodium 1-phenyl-4-oxo[1]benzopyrano[2,3-c]pyrazole-6-carboxylate monohydrate

B: 1-(p-carboxyphenyl)-4-oxo-[1]benzopyrano[2,3-c]pyrazole-6-carboxylic acid

C: p-(4-oxo-[1]benzopyrano[2,3-c]pyrazol-1-yl)benzoic acid

Formulation Examples

The following is an example of formulations when a compound of the invention is administered for pharmaceutical purposes:

a. 10 mg tablets are prepared from the following compositions:

| | |
|---|---|
| Compound (I) | 10 mg |
| Lactose | 70 |
| Corn Starch | 38 |
| Methyl Cellulose | 1 |
| Magnesium Stearate | 1 |
| | 120 mg |

The tablets may be sugar-coated in a conventional manner.

b. 2% aerosol inhalants are prepared from the following compositions:

| | |
|---|---|
| Compound I | 2 % |
| Sorbitan Trioleate | 0.2 |
| Freon-113 ($CCl_2F$—$CClF_2$) | 12.8 |
| Freon-11 ($CCl_3F$) | 19.5 |
| Freon-12 ($CCl_2F_2$) | 46 |
| Freon-114 ($CClF_2$—$CClF_2$) | 19.5 |
| | 100% |

Starting Materials

The starting materials, namely compounds of formula (II) to be used in the production of the compounds of the present invention, can be prepared by the method as described in the following reaction scheme:

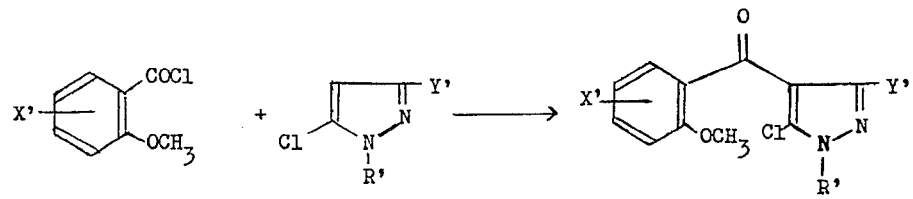

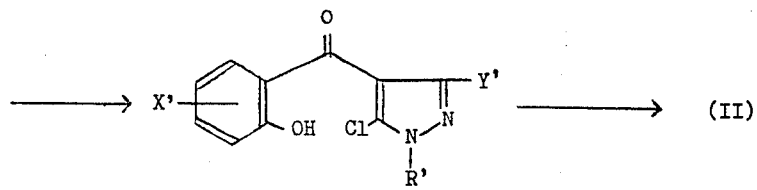

A specific example of the preparation of the starting materials of formula (II) is as follows:

5-Chloro-1-phenyl-pyrazole is reacted with 2-methoxy-5-methylbenzoyl chloride in tetrachloroethane in the presence of zinc chloride. The resultant 5-chloro-4-(2-methoxy-5-methylbenzoyl)-1-phenylpyrazole is hydrolized in 48% hydrobromic acid to give 5-chloro-4-(2-hydroxy-5-methylbenzoyl)-1-phenylpyrazole. The product after recrystallization from ethanol shows a melting point of 100°–102°C.

A mixture of 6.2 g of 5-chloro-4-(2-hydroxy-5-methylbenzoyl)-1-phenylpyrazole and 1 g of sodium hydroxide in 30 ml of water is heated at 60°–70°C with stirring for 1 hour. The precipitate is then collected by suction filtration, and washed well with water to give 4.8 g of 1-phenyl-4-oxo-6-methyl-[1]benzopyrano[2,3-c]pyrazole. The product after recrystallization from ethanol shows a melting point of 149°–150°C.

Similarly, the following starting materials of formula (II) are produced:

a. 1,6-dimethyl-4-oxo[1]benzopyrano[2,3-c]pyrazole, melting at 151°–152°C;
b. 3,6-dimethyl-4-oxo-[1]benzopyrano[2,3-c]pyrazole, melting at 184°–187°C;
c. 1-phenyl-3,6-dimethyl-4-oxo-[1]benzopyrano[2,3-c]pyrazole, melting at 145°–147°C;
d. 1-phenyl-3-methyl-4-oxo[1]benzopyrano[2,3-c]pyrazole, melting at 168°–170°C;
e. 1,3,6-trimethyl-4-oxo-[1]benzopyrano[2,3-c]pyrazole, melting at 146°–148°C;
f. 1,6-dimethyl-3-propyl-4-oxo-[1]benzopyrano[2,3-c]pyrazole, melting at 34°–39°C;
g. 1,3-dimethyl-4-oxo-6-isopropoxy-[1]benzopyrano[2,3-c]pyrazole, melting at 153°–154°C;
h. 3-methyl-4-oxo-[1]benzopyrano[2,3-c]pyrazole, melting over 250°C;
i. 1-phenyl-3-isobutyl-4-oxo-6-methyl-[1]benzopyrano[2,3-c]pyrazole, melting at 160°–162°C.

Although the present invention has been adequately discussed in the foregoing specification and examples included therein, one readily recognizes that various changes and modifications may be made without departing from the spirit and scope thereof.

What is claimed is:

1. Claim 1. The compound: 1-(p-carboxyphenyl)-4-oxo-[1]benzopyrano [2,3-c]pyrazole-6-carboxylic acid and the pharmaceutically acceptable metal salts thereof.

2. The compound: 1-phenyl-4-oxo-[1]benzopyrano[2,3-c]pyrazole-6-carboxylic acid and the pharmaceutically acceptable metal salts thereof.

3. The compound: 1-phenyl-3 isobutyl-4-oxo-[1]benzopyrano [2,3-c]pyrazole-6-carboxylic acid and the pharmaceutically acceptable metal salts thereof.

4. The compound: 4-oxo- 1]benzopyrano[2,3-c]pyrazole-3-carboxylic acid and the pharmaceutically acceptable metal salts thereof.

5. The compound: p-(4-oxo-[1]benzopyrano-[2,3-c]pyrazol-1-yl) benzoic acid and the pharmaceutically acceptable metal salts thereof.

* * * * *